(12) United States Patent
Banerjee (10) Patent No.: US 7,374,688 B2
(45) Date of Patent: May 20, 2008

(54) SPARK-INDUCED CONSOLIDATION OF SLUDGE

(75) Inventor: Sujit Banerjee, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 362 days.

(21) Appl. No.: 11/199,444

(22) Filed: Aug. 8, 2005

(65) Prior Publication Data

US 2006/0032822 A1    Feb. 16, 2006

Related U.S. Application Data

(60) Provisional application No. 60/601,827, filed on Aug. 16, 2004.

(51) Int. Cl.
    C02F 1/36    (2006.01)
    C02F 1/52    (2006.01)
    C02F 11/12   (2006.01)
(52) U.S. Cl. .......................... 210/702; 204/164; 210/748
(58) Field of Classification Search .................. 210/702
    See application file for complete search history.

(56) References Cited

U.S. PATENT DOCUMENTS

| | | | | |
|---|---|---|---|---|
| 5,026,484 A | * | 6/1991 | Juvan | 204/571 |
| 5,049,248 A | * | 9/1991 | Muralidhara et al. | 204/545 |
| 5,472,620 A | * | 12/1995 | Huang | 210/748 |
| 5,630,915 A | * | 5/1997 | Greene et al. | 204/164 |
| 5,695,650 A | * | 12/1997 | Held | 210/748 |
| 5,827,432 A | * | 10/1998 | Huhtamaki et al. | 210/705 |
| 6,482,327 B1 | * | 11/2002 | Mori et al. | 210/695 |
| 6,572,733 B1 | | 6/2003 | Banerjee | |

OTHER PUBLICATIONS

Watanabe, Y., and Tanaka, K., "Innovative Sludge Handling Through Pelletization/Thickening", 1999, pp. 3245-3252, *Water Research*, vol. 33, No. 15.

Golla, P. S., and Johnson, H. W., "Application of Electro Acoustics for Dewatering Pharmaceutical Sludge", Feb. 1992, pp. 74-79, *Environmental Progress*, vol. 11, No. 1.

Riera, E., Gallego, J. A., Rodriguez, G., Elvira, L., and Gonzalez, I., "Application of high-power ultrasound to enhance fluid/solid particle separation processes", 2000, pp. 642-646, *Ultrasonics* 38.

Corcoran, H., Sung, D-J., and Banjeree, S., "The Detackification of Stickies Using Plasma-Spark Technology", 2000, pp. 1-8, TAPPI Papermaker's Conference, Vancouver, Canada.

Corcoran, H., Sung, D-J., and Banjeree, S, "Electrohydraulic Discharge Detackifies Polymer Surfaces in Water", 2001, pp. 152-155, *Industrial & Engineering Chemistry Research* 40.

Soszynski, S., Jain, J.S., Tata, P., Lue-Hing, C., Carns, K., and Perkins, D., "Effect of Pulse Power Technology on the Dewaterability of Anaerobically Digested Sludge", Jan. 1999, Report No. 99-1, Metropolitan Water Reclamation District of Greater Chicago, Chicago, Illinois.

(Continued)

*Primary Examiner*—Peter A. Hruskoci
(74) *Attorney, Agent, or Firm*—Troutman Sanders LLP; Ryan A Schneider; James Hunt Yancey, Jr.

(57) ABSTRACT

Exposing sludge to underwater, high-intensity sparks, to increase cake solids, provide faster settling, and increase the rate of dewatering.

18 Claims, 9 Drawing Sheets

OTHER PUBLICATIONS

Spengler, J., and Jekel, M., "Ultrasound conditioning of suspensions—studies of streaming influence on particle aggregation on a lab- and pilot-plant scale", 2000, pp. 624-628, *Ultrasonics* 38.

Doktycz, S.J., and Suslick, K.S., "Interparticle Collisions Drivin by Ultrasound", Mar. 1990, pp. 1067-1069, *Science* 247.

Mikkelsen, L.H., and Keiding, K., "The shear sensitivity of activated sludge: an evaluation of the possibility for a standardized floc strength test", 2002, pp. 2931-2940, *Water Research* 36.

Larsson, A., Sunesson, A., Garmer, J., and Kröll, S., "Laser-Triggered Electrical Breakdown in Liquid Dielectrics", Apr. 2001, pp. 212-219, *IEEE Transactions on Dielectrics and Electrical Insulation*, vol. 8, No. 2.

* cited by examiner

SPARK-INDUCED CONSOLIDATION OF SLUDGE

BENEFIT CLAIMS TO PRIOR APPLICATIONS

This application claims the benefit of U.S. Provisional Application No. 60/601,827, filed 16 Aug. 2004.

FIELD OF THE INVENTION

The present invention generally relates to the art of dewatering sludge, and more particularly to a system and method for increasing the solids content of the dewatered sludge, and increasing the rate of sludge dewatering.

BACKGROUND OF THE INVENTION

Sludge is produced during the biological treatment of wastewater. It is also produced through a variety of processes, such as the manufacture of pulp and paper. As shown in a conventional process of FIG. 1, wastewater W is typically fed into a reactor 10 containing a suspension of microorganisms, most of which are acclimated to grow on or otherwise decompose the dissolved organic material contained in the wastewater W.

Figure 1:
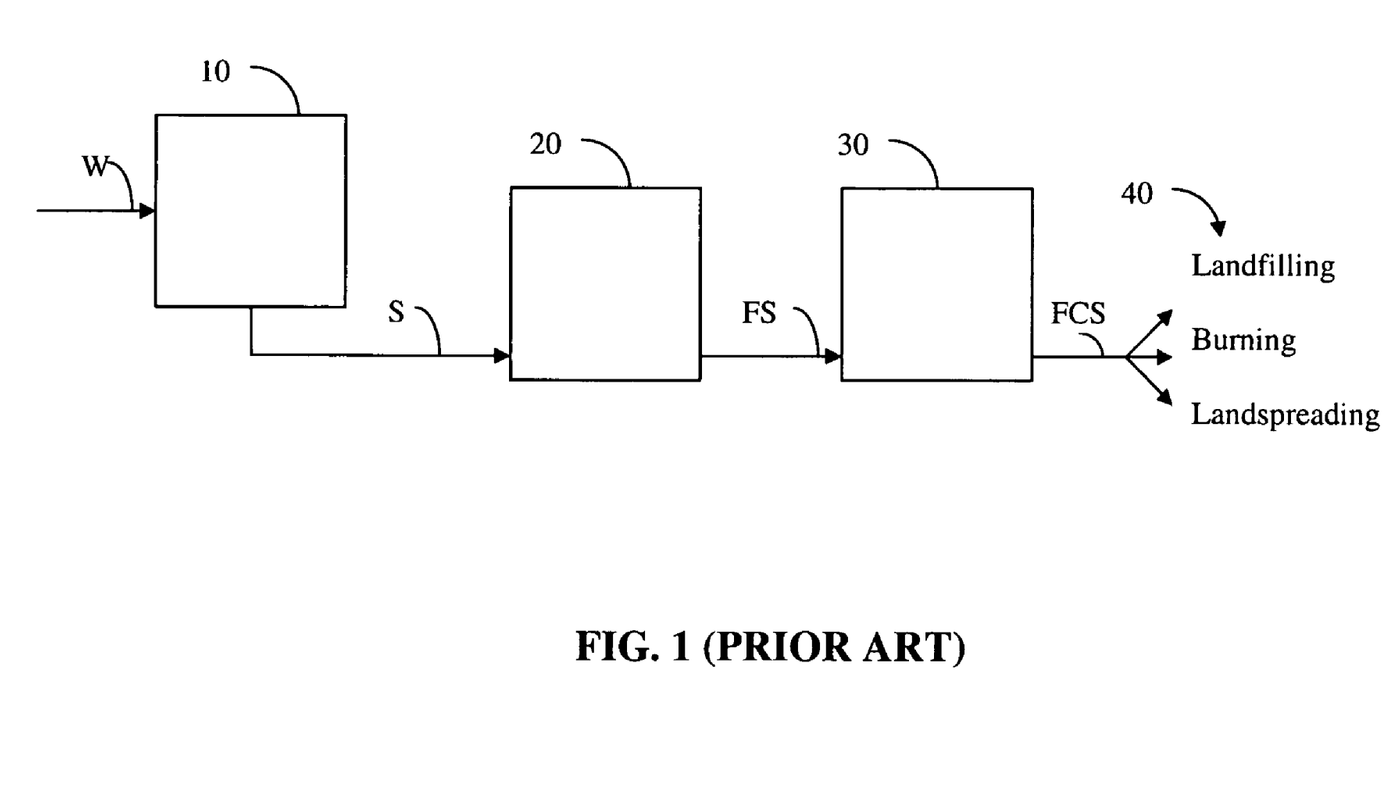
FIG. 1 is a prior art method of the biological treatment of wastewater.

A fraction of the microorganisms dies and settles out. These solids, along with other solid debris that settles out from the wastewater, constitute sludge S that must be disposed of. The sludge S is typically collected and treated with chemicals at step 20 that promote flocculation of the sludge particles. One example of such chemical treatment is through use of thickeners such as polymers or lime. [1] Mechanical thickening has also been reported although the process has not been commercialized.

The flocculated sludge FS is dewatered at step 30, using various dewatering devices well-known in the art, including, but not limited to, presses of various configurations, and centrifuges. The dewatered sludge, or final cake solids FCS, are typically in the range of about 15-50% consistencies (i.e. 85-50% water content).

The final cake solids FCS are disposed of at step 40 through means such as landfilling, burning, or landspreading. The water contained in the dewatered sludge is a deadload, and it is thus advantageous to reduce the water content of the final cake solids as far as possible.

An electro-acoustic process where the application of electric and acoustic fields consolidates the cake and increases final solids is known. [2] Ultrasonic energy has been shown to dewater fine-particle high-concentration suspensions such as slurries and sludges. [3]

Discharging a high-intensity spark underwater generates a sound wave, and it has recently been demonstrated that some applications that rely on acoustics can also be conducted with an underwater sparker. For example, trace levels of adhesives in process streams of mills that recycle paper can be oxidized by either ultrasonic radiation or sparking. [4-6] However, the spark application can be more economical in terms of both capital and operating costs. [6].

Underwater sparking has been applied to anaerobically digested sludge in an effort to reduce polymer use. [7] Limited pilot-scale success was achieved with low-conductivity sludge, but the spark source was of relatively low energy (0.25 J), and the application did not successfully scale up.

It would be beneficial to demonstrate that exposing biological sludge to underwater sparks of much higher energy (~10 kJ) leads to acoustic agglomeration of the particles, which results increased cake solids, and faster settling.

Increasing the cake solids by even a relatively small amount would reduce the amount of water that must be disposed of together with the sludge solids. The rate of dewatering is also an important factor that affects the efficiency and cost of processing of the sludge. If the dewatering rate is slow, then the throughput will be low.

Therefore, there is a need for a system and method for increasing the solids content of dewatered sludge. There is also a need for a system and method for increasing the rate of sludge dewatering by altering the properties of the sludge.

REFERENCES

The following references are noted both hereinabove and hereinbelow, and are incorporated herein by reference.

[1] Watanabe, Y. and Tanaka, K. (1999) Innovative sludge handling through pelletization/thickening. *Water Research* 33, 3245-3252.

[2] Golla P. S, Johnson H. W. and Senthilnathan, P. R. (1992) Application of electroacoustics for dewatering pharmaceutical sludge. *Environmental Progress* 11 (1), 74-79.

[3] Riera, E., Gallego, J. A. Rodriguez, G., Elvira, L. and Gonzalez, I. (2000) Application of high-power ultrasound o enhance fluid/solid particle separation processes. *Ultrasonics* 38, 642-646.

[4] Banerjee, S. (2003) System and method for altering characteristics of materials using an electrohydraulic discharge, U.S. Pat. No. 6,572,733 B1.

[5] Corcoran, H., Sung, D-J., Banerjee, S., (2000) Detackification of stickies using plasma-spark technology, TAPPI Papermaker's Conference, Vancouver, Canada.

[6] Corcoran, H., Sung, D-J. and Banerjee, S. (2001) Electrohydraulic discharge detackifies polymer surfaces in water. *Industrial & Engineering Chemistry Research*, 40 152-155.

[7] Soszynski, S., Jain, J. S., Tata, P., Lue-Hing, C., Carns, K. and Perkins, D. (1999) Effect of pulse power technology on the dewaterability of anaerobically digested sludge. Report No. 99-1. Metropolitan Water Reclamation District of Greater Chicago, Chicago, Ill.

[8] Spenger, J. and Jekel, M. (2000). Ultrasound conditioning of suspensions—studies of streaming influence on particle aggregation on a lab- and pilot-plant scale, *Ultrasonics*, 38, 624-628.

[9] Doktycz, S. J. and Suslick, K. S. (1990) Interparticle collisions driven by ultrasound. *Science* 247, 1067-1069.

[10] Mikkelsen L. H. and Kelding K. (2002) The shear sensitivity of activated sludge: An evaluation of the possibility of a standardised floc strength test. *Water Research* 36 (12), 2931-2940.

[11] Larsson, A. Sunesson, A., Garmer, J. and Kroll, S. (2001) Laser-Triggered Electrical Breakdown in Liquid Dielectrics. *IEEE Transactions on Dielectrics and Electrical Insulation* 8 (2). 212-219.

SUMMARY OF THE INVENTION

Briefly described, in a preferred form, the present invention provides a solution to the above-described needs, by providing a beneficial sludge processing system and method that increases both the cake solids, and the rate of dewatering, by exposing the sludge slurry to an acoustic field. In a preferred embodiment, the sludge is exposed to a pulsed acoustic field.

Subjecting a suspension of biological sludge to a pulsed acoustic field derived from, as an example, underwater sparks of 6 kV and 50 kA, leads to its consolidation, decreases the charge density on the solids, and increases its settling rate. The acoustic field of the present invention preferably consolidates particles that are smaller than about 400 µm in radius.

The conventional method of treating sludge includes the step of promoting flocculation of the sludge, which typically comprises treating the sludge with chemicals that promote the agglomeration of the sludge particles into flocs that can be more easily dewatered.

This known method of treating sludge also includes the step of dewatering the sludge at a dewatering rate to form a cake with a solids content, which typically comprises subjecting the flocculated sludge to a belt press or centrifuge, wherein the chemically-treated sludge is dewatering therein.

The present invention modifies the prior art system and method of treating sludge, by exposing the sludge to an acoustic field during its treatment, to increase its solids content, and to increase the dewatering rate.

That is, the present invention improves upon the conventional method of treating sludge that includes the steps of (i) promoting flocculation of the sludge (usually by chemical introduction) and (ii) dewatering the sludge at a dewatering rate to form a cake with a solids content (usually by a press or centrifuge), the present invention comprising the improvement of a step of (iii) exposing the sludge to an acoustic field, which step increases the dewatering rate of the sludge over that which is provided in the conventional method (without the novel and non-obvious step of exposing the sludge to the acoustic field). The step of exposing the sludge to an acoustic field occurs prior to the step of promoting flocculation of the sludge.

In another preferred embodiment, the additional step of exposing the sludge to an acoustic field increases the solids content of the sludge after the step of dewatering over that which is provided in the conventional method (without the novel and non-obvious step of exposing the sludge to the acoustic field).

In another preferred embodiment, the additional step of exposing the sludge to an acoustic field increases both the dewatering rate and the solids content of the sludge over that which is provided in the conventional method.

The acoustic field is preferably a pulsed acoustic field provided by sparks from a sparking device. When the spark is discharged, the slurry experiences the effects of the discharge.

The electrodes of the sparking device can be integrated in a reactor containing the slurry, or they can be constructed as part of an assembly that can be submerged into a vessel or tank containing the sludge slurry. In a preferred embodiment, the step of exposing the sludge to an acoustic field occurs prior to the step of promoting flocculation of the sludge.

After exposure to the sparks, the sludge preferably is blended with chemicals of various types known in the art. These chemicals promote the agglomeration of the sludge particles into flocs that can be more easily dewatered. The chemically-treated sludge is then conveyed to a dewatering device, such as a belt press, a screw press or a centrifuge, which are commonly used in the art.

One such sparking device, the Sparktec plasma sparker (SPK-8000), was manufactured and sold by Pulse Power, Stoney Creek, Ontario, Canada. The device includes of a pair of submersible electrodes cabled to capacitors. The electrodes whose dimensions can range up to about four feet tall, about five inches wide and about 2.5 inches deep, can be placed in open water or it can be positioned in pipes.

A voltage of about 6 kV and about 50 kA is impressed between the two submerged electrodes. The spark discharge produces a shock wave, a sound wave and ultraviolet and other radiation. It also generates reactive chemical species in the vicinity of the electrodes. The main components of the sparking device include a constant current power supply, high current/high voltage capacitors, a high current/high voltage switch, a controller, and a submersible discharge assembly with feeding electrode system.

When the sparker is activated, the capacitors are rapidly charged with electricity. At a desired interval, the high voltage/high current switch releases the stored energy from the capacitors to the electrodes. The high voltage/high current released from the capacitors then bridges the gap at the electrodes causing the spark event.

Applications of the sparking device to the treatment of chemicals present in process streams in the paper industry have been disclosed in [4], and in U.S. Pat. No. 6,521,134 to Banerjee and Corcoran. The use of a similar sparking device to control the proliferation of zebra mussels has been disclosed in U.S. Pat. No. 5,432,756 to Bryden.

In the present method, the sludge suspension is exposed to multiple sparks. The sparked sludge is then treated with chemicals such as polymers, lime, or ferric chloride, either singly, or in various combinations thereof. Such chemicals are used to flocculate the sludge, and are well known in the art. The chemically treated sludge is then dewatered by a device such as, but not limited to, a belt press, a screw press or a centrifuge, which are well known in the art.

In the application of spark technology in sludge dewatering disclosed in [7], the sludge was pumped into a chamber wherein the sludge slurry was exposed to sparks. The electrical discharge into the sparker ranged in power from 100 W to 5 MW (from 10 to 50 kV with a current ranging from 10 to 100 A). No increase in cake solids was measured under any conditions.

The present invention is patentably distinct from prior art attempts in many ways, for example, by using a power, 300 MW, nearly two orders of magnitude higher than known methods (6 kV and about 50 kA), and where significantly higher cake solids are obtained after exposing sludge to the sparking device.

The present invention provides the benefit of increasing the cake solids of the sludge after the dewatering operation and increasing the rate of dewatering of the sludge during the dewatering operation. These benefits provide substantial cost savings by reducing the mass and volume of the sludge that needs to be disposed of, and by increasing the efficiency of the dewatering process.

These and other objects, features and advantages of the present invention will become more apparent upon reading the following specification in conjunction with the accompanying drawings.

DETAILED DESCRIPTION OF PREFERRED EMBODIMENTS

In a method of treating a suspension of particles in a fluid including the steps of (i) promoting flocculation of the particles and (ii) dewatering the flocs at a dewatering rate to form a cake with a solids content, the present invention includes an improvement comprising the step (iii) of exposing the suspension to an acoustic field, which step (iii) increases the dewatering rate of the flocs over that which is provided without step (iii).

The suspension of one embodiment of the present method can include a suspension of biological sludge in water. In another embodiment, the suspension is a suspension of non biological fibrous material of particle size of less than about 2 mm.

The acoustic field of the present method is preferably a pulsed acoustic field, derived from a plurality of sparks generated at a power of greater than 5 MW, and more preferably at a power of between 100 MW to 400 MW. The acoustic field of the present method is preferably derived from a plurality of sparks generated at an amperage of greater than 100 A, and more preferably at an amperage of between 10 kA to 100 kA.

The present invention is a system and method for altering the properties of sludge in a manner that increases the rate at which the sludge is dewatered, and increases the moisture content of the dewatered cake. The basis of the method lies in exposing the sludge to the effects of an acoustic field, preferably from multiple discharges from a sparking device.

Figure 2:
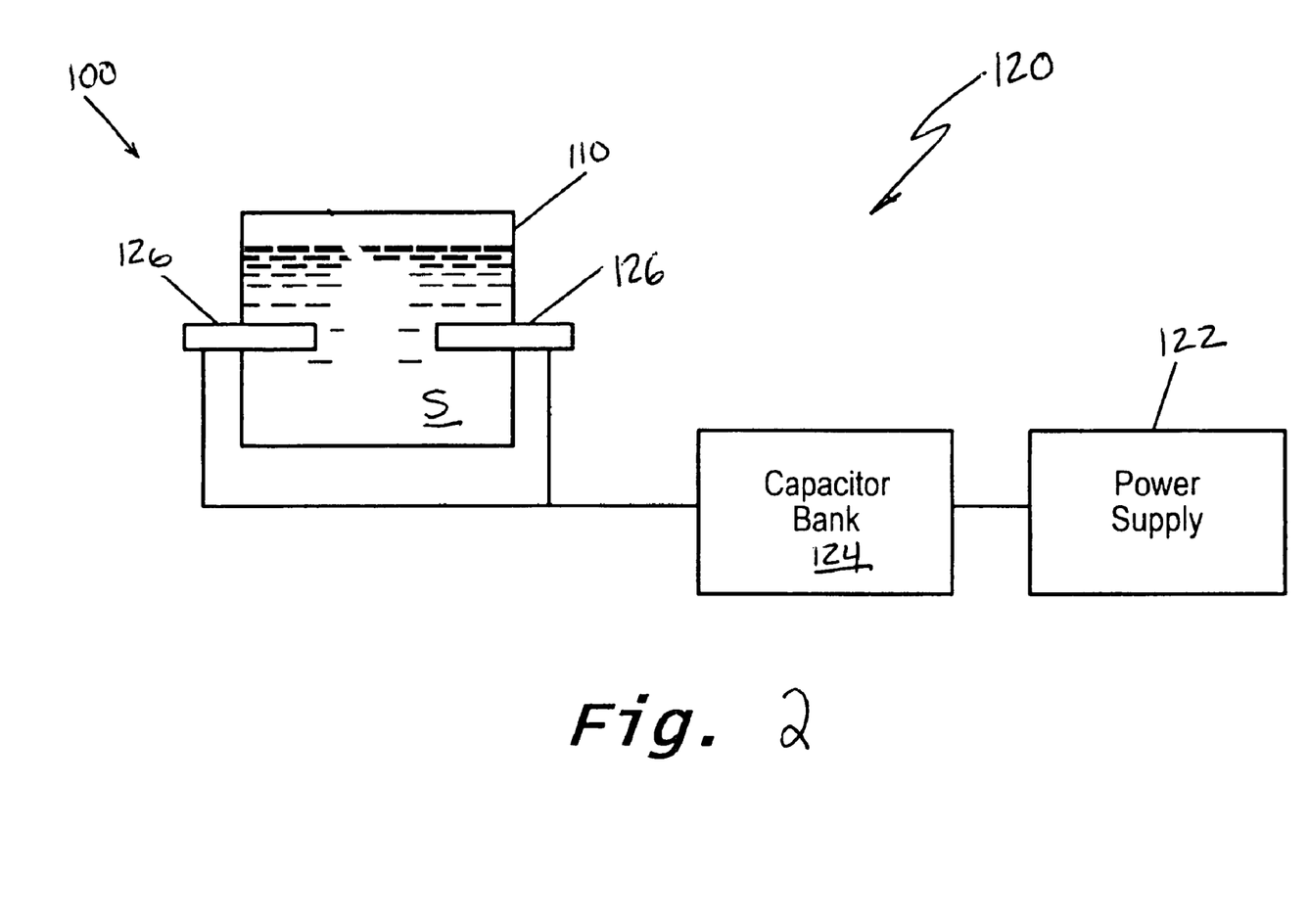
FIG. 2 is an illustration of a preferred embodiment of a sparker assembly of the present invention.

Referring to FIG. 2, a first preferred embodiment of the present system 100 is illustrated. The system 100 includes a chamber 110 for housing a sludge slurry S, and a sparking device 120, comprising a power supply 122, a capacitor bank 124, and a pair of electrodes or sparker 126. A sparking device that can be used in the present invention is the Sparktec plasma sparker (SPK-8000), which is manufactured and sold by Sparktec Environmental of Stoney Creek, Ontario, Canada.

Specifically, the pair of submersible electrodes or sparker 126 is cabled to a bank of capacitors housed in the capacitor bank 124. The sparker 126 releases the energy stored by the capacitors and may be placed in the chamber 110 containing a sludge slurry S. Alternatively, the sparker 126 may be positioned in a tank or other container. The sparker 126 may include a feeding mechanism (not shown), which ensures that the gap between the electrodes remains constant.

The power supply 122 controls power management, and is functionally connected to the capacitor bank 124 for providing a constant current power supply to the capacitor bank 124. The power supply 122 may include a computer interface, which monitors the supply unit, controls the electrode feed mechanism, if present, and times the high voltage/high current discharge pulse generated by the bank of capacitors.

The capacitor bank 124 contains a bank of high voltage discharge capacitors for storing energy. The capacitor bank 124 may include a switch mechanism (not shown), which triggers the release of a high voltage/high current pulse to the sparker 126.

It will be appreciated by those skilled in the art that the present invention may include many suitable power supplies capable of controlling power management and converting AC current to high DC voltages. It is further appreciated that the present invention may utilize many types of pairs of electrodes suitable for releasing high voltage/high current energy and capable of being properly secured such that the gap between the electrodes remains constant. For example, a pair of electrodes may be securely clamped or welded to a chamber or an air compressor may be used to ensure that the gap between the electrodes remains constant.

The system 100 operates by injecting energy into sludge slurry S through a plasma channel formed by a high-current/high-voltage electrical discharge between the two submersed electrodes 126. The system 100 works, in essence, on the same principle as a spark plug.

Specifically, a high voltage and a high current are impressed between the pair of electrodes 126, also referred to herein as a sparker 126, for a very short duration such that the energy dissipates by shock waves and sonic/ultrasonic waves that break up the water molecules. Consequently, the water molecules closest to the spark break up due in part to the spark itself, while the water molecules at some distance from the spark break up due to the sound waves caused by the spark.

The electrohydraulic discharge or spark also produces ultraviolet and other radiation and generates reactive chemical species, such as hydroxyl radicals and other oxidants. As used herein, the terms "electrical discharge" and "electrohydraulic discharge" are used interchangeably, where electrohydraulic discharge means an electrical discharge that takes place in a liquid medium.

In the present invention, the high power used is preferably in the range of 5 MW to 2 GW, and more preferably in the range of 100 MW to 400 MW. The high voltage used is preferably in the range of 500 V to 20 kV, and more preferably in the range of 2 kV to 8 kV. The high current used is preferably in a range of 10 kA to 100 kA, and even more preferably about 50 kA. The duration of the electrical discharge is preferably less than 1 second, and more preferably in the range of 5 ms to 500 ms, and even more preferably about 150 ms.

When the sparker 126 is activated by supplying power from the power supply 122 to the capacitors in the capacitor bank 124, the capacitors are rapidly charged with electricity. At a predetermined interval, a process controlled high voltage/high current switch (not shown) associated with the capacitor bank 124 releases the stored energy from the capacitors to the electrodes 126 located in the chamber 110 containing the sludge slurry S. The high voltage/high current released from the capacitors then bridges the gap at the electrodes 126 causing the spark. Each spark preferably has energies ranging from 0.1 kJ to 25 kJ, and more preferably about 12 kJ.

Figure 3:
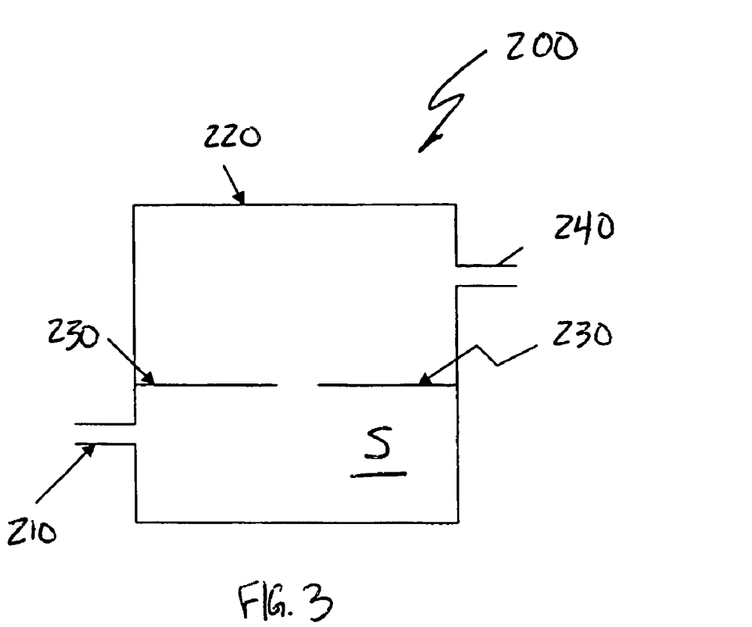
FIG. 3 is an illustration of another preferred embodiment of a sparker assembly of the present invention.

Referring to FIG. 3, another preferred embodiment of a sparking device 200 is illustrated. In FIG. 3, a slurry of sludge is introduced through an inlet tube 210 into a vessel 220 incorporating two electrodes 230. The electrodes 230 are connected to a capacitor where the power is accumulated. The sludge S is contained in the vessel 220 in such a way that the electrodes 230 are completely immersed in the sludge slurry.

The electrodes 230 can be discharged repeatedly into the slurry. Following exposure, the sludge is removed from the vessel from an outlet tube 240. The sludge can be treated batch-wise or by pumping the slurry through the vessel 220 while the sparker 200 is in continuous operation.

Figure 4:
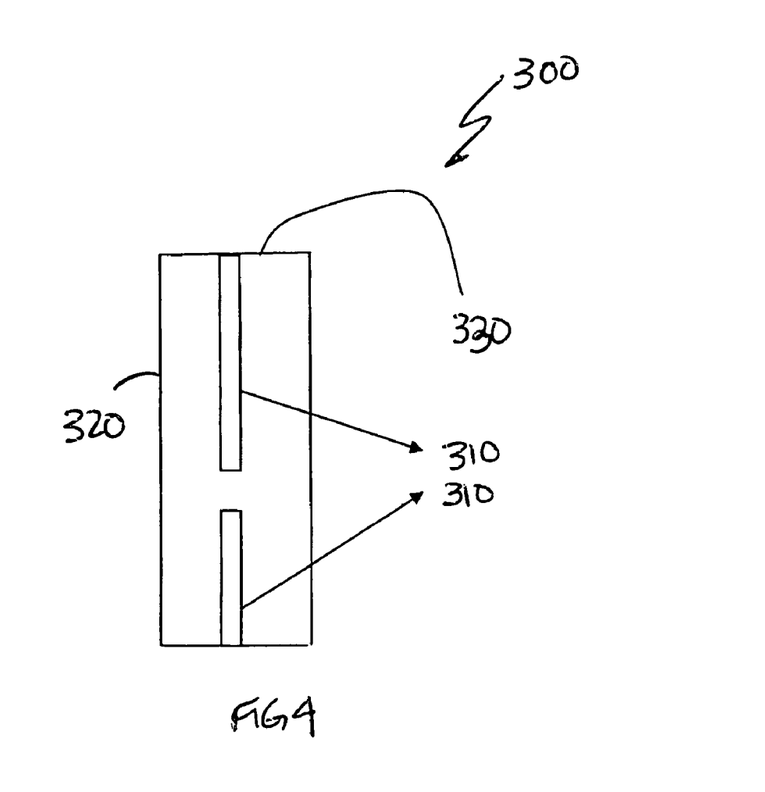
FIG. 4 is an illustration of yet another preferred embodiment of a sparker assembly of the present invention.

FIG. 4 illustrates another preferred embodiment of a sparking device 300. The electrodes 310 are integrated within a submersible casing 320 and are connected through leads 330 to the capacitor unit, which can be distal to the casing 320. This embodiment allows the electrode assembly to be submerged into a process stream or into a tank, and repetitively expose the liquid stream to the effects of sparking.

The present invention is not limited to the use of one sparker for the treatment of sludge. Multiple sparkers may be used. The sparkers may discharge at different times or at the same time. The sparkers may be arranged such that each has its own capacitor bank and power supply. Alternatively, the sparkers may share a common capacitor bank and/or power supply. Also, at least one sparker may be placed directly in a tank containing the slurry, instead of, or in addition to, placing the sparker along the pipe or channel through which the slurry flows.

The following examples, which are merely illustrative of the present invention, further demonstrate application of the present invention, as well as demonstrate the benefits associated therewith.

EXAMPLE 1

A sparker was obtained from Pulse Power Technologies, Stoney Creek, Ontario, Canada. The sludge was sparked in a 10-L tank constructed from a section of pipe with integrated 1.3-cm diameter stainless steel electrodes. A discharge of 150 MW (50 kA and 3 kV) was made at 12-second intervals. High-speed video images were taken with a Kodak EktaPro HR-1000 camera capable of 1-ms resolution. Specific charge quantity was measured at a pH of 7.6-7.8 with a Mutek 03m Particle Charge Detector from Mutek Analytic Inc., Marietta, Ga. Floc diameter was determined with a microscope; the values cited were averaged over fifty readings, with an average standard deviation of 20%. Fiber length was measured with an LD96 Fiber Quality Analyzer (FQA) from OpTest, Hawkesbury, Canada. The results reported were averaged over 5,000 readings. The Crown Press was purchased from Neogen Corporation, Lansing, Mich.

Two types of biological sludge were obtained from a municipal treatment plant. Sludge (0.46% solids) collected from the surface of the aeration basin was thickened to 1.29% solids by allowing it to settle and pouring off the supernatant. This material is referred to as surface sludge. Lime was added at 0.65% of dry solids. Bottom sludge was collected from the bottom of the aeration basin at 3.41% solids; lime addition increased the solids to 3.53%. The settling rate of the sludge was determined by placing 250 ml of the sludge with and without prior exposure to sparks in a 3.7-cm diameter cylinder and measuring the clarified volume.

Paper mill primary sludge was simulated using southern pine fiber. Different size fractions of the fiber were obtained by first drying the fiber overnight at 105° C. The dry material was then shaken to break up the fibers and sieved through 40, 60, and 200 mesh screens. These correspond to 250, 125 and 75 μm holes, respectively. The average fiber lengths accepted by these screens were 454, 326 and 212 μm, respectively, as measured by the FQA. The length of the unscreened fiber was 2.8 mm. The fibers were suspended in water at a consistency of 0.10% and sparked.

The total suspended solids (TSS) of the suspension were measured in two different ways. First, the samples were centrifuged at 400 g for ten minutes, and the TSS of the supernatant determined by filtering and drying the residue. Second, the sample was poured into a funnel and allowed to settle for ten minutes. The TSS of the supernatant was then measured.

Bottom Sludge

Figure 5:
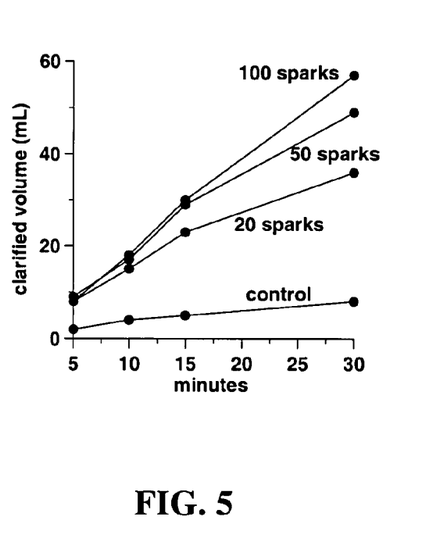
FIG. 5 is a graph illustrating the relationship between sparking and the settling rate of untreated sludge.

Sparking the bottom sludge greatly increased the settling rate as shown by the representative results illustrated in FIG. 5, demonstrating that the settling rate increases progressively upon sparking. The zeta potential of the colloidal material, determined after centrifuging out the solids at 400 g for ten minutes, remained unchanged at −3 mV. The insensitivity of the zeta potential suggests that sparking does not significantly alter the chemistry of the colloidal material; by extension, the sludge particles are probably also unaffected. It would be surprising if it were otherwise, since the hydroxyl radical yield from sparking is quite small.

In this example, the additional step of exposing the sludge to the sparker increased the settling rate from about 350% to about 600% over that which is provided in the conventional method, in view of the 30-minute clarification volume. Sparking improved the settling rate over the control, wherein the control had a 30-minute clarification volume of approximately 10 ml, and the sparked sludge had a 30-minute clarification volume over approximately 10 ml, and preferably over 30 ml.

The total suspended solids (TSS) of the suspension decreased substantially upon sparking (as shown in Table 1), which is in keeping with solids agglomeration. Corresponding measurements made with lime-treated sludge are included in FIG. 6 and Table 1.

Figure 6:
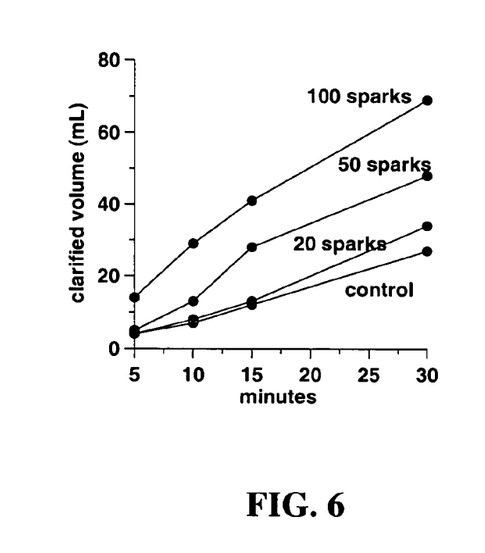
FIG. 6 is a graph illustrating the relationship between sparking and the settling rate of sludge treated with lime.

A similar increase in the settling rate is obtained with lime-treated sludge, as illustrated by the data presented in FIG. 6, wherein the sparker increased the settling rate from about 10% to about 250% over that which is provided in the conventional method. Sparking improved the settling rate over the control, wherein the control had a 30-minute clarification volume of approximately 25 ml, and the sparked sludge had a 30-minute clarification volume over approximately 25 ml, and preferably over 50 ml (for 50 and 100 sparks).

TABLE 1

Effect of sparking on supernatant solids (mg/l).

| | sparks: | | | |
| --- | --- | --- | --- | --- |
| | 0 | 20 | 50 | 100 |
| | untreated | | | |
| solids after centrifuging | 15.5 | 8.81 | 6.60 | 8.46 |
| solids after settling | 26.0 | 24.9 | 8.27 | 11.0 |

TABLE 1-continued

Effect of sparking on supernatant solids (mg/l).

| | sparks: | | | |
|---|---|---|---|---|
| | 0 | 20 | 50 | 100 |
| | lime-treated | | | |
| solids (after centrifuging) | 67.1 | 45.6 | 31.0 | 28.7 |
| solids (after settling) | 102 | 55.9 | 35.1 | 30.9 |

A comparison between FIGS. 5 and 6 reveals that lime-treatment increases the settling rate of the control as expected, but has a smaller effect on the sparked samples. The proportional decrease in TSS upon sparking is roughly the same for both the lime-treated and untreated sludge as shown in Table 1.

Microscopic inspection of the settled sludge confirms that sparking consolidates the solids. Aggregates were commonly found in the treated material, but not in the unsparked control as shown in the typical micrographs illustrated in FIGS. 7 and 8.

Figure 7:
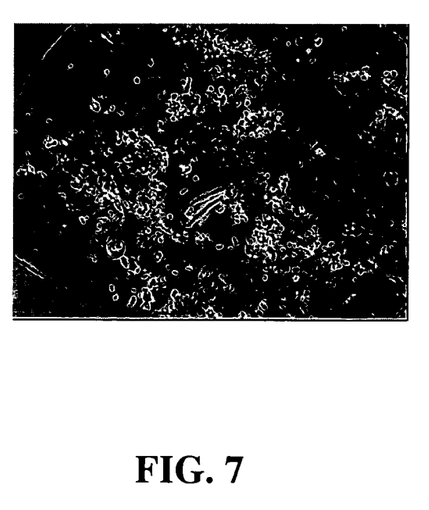
FIG. 7 is a micrograph of sludge particles in a slurry taken at a magnification of 400.
Figure 8:
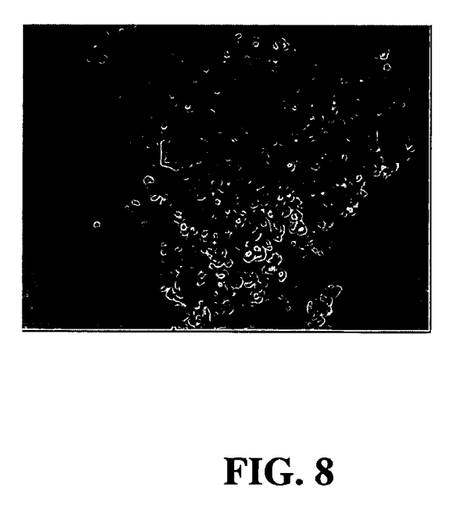
FIG. 8 is a micrograph taken at a magnification of 400 illustrating the effect of sparking on the physical characteristic of sludge particles in a slurry.

FIG. 7 illustrates a micrograph of sludge particles in a slurry prior to chemical treatment. FIG. 8 depicts a micrograph of sludge particles in a slurry after the sludge was exposed to 200 sparks. The degree of aggregation of the particles exposed to sparks as shown in FIG. 8 is much greater than the aggregation of the particles in FIG. 7, which were not exposed to the sparks.

Figure 9:
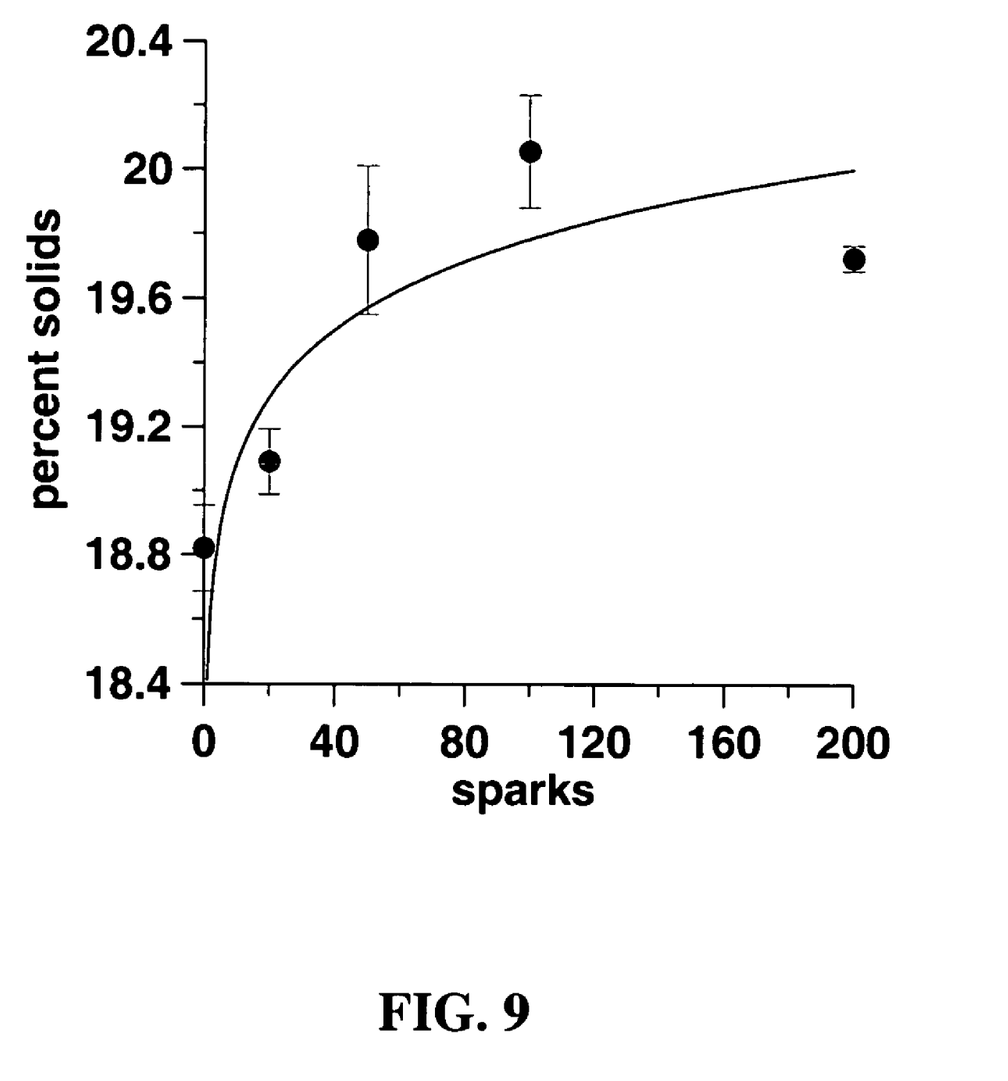
FIG. 9 is a graph illustrating the increase in cake solids obtained by exposing lime-treated sludge to sparks.

The lime-treated sample was sparked and dewatered in a Crown Press (a belt press simulator) at an applied force of 1.07 kN for three minutes. The increase in solids obtained by exposing the sludge to sparks is illustrated in FIG. 9. In this example, the additional step of exposing the sludge to the sparker increased the solids content of the sludge from approximately 18.8% with no sparking, to approximately 20.1% with 90 sparks (being a 1.6% to 6.9% increase over that which is provided in the conventional method (without the novel and non-obvious step of exposing the sludge to a sparker).

The resulting solids in the sparked sludge were higher than that of the control, as shown in FIG. 9, suggesting that the binding of water to sludge solids is at least minimally affected by sparking.

Surface Sludge

Figure 10A:
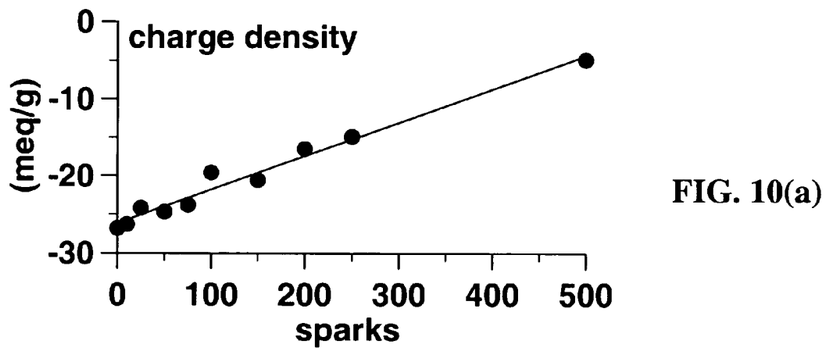
FIGS. 10(a) and 10(b) are graphs illustrating the effect of sparking on charge density and floc diameter.
Figure 10B:
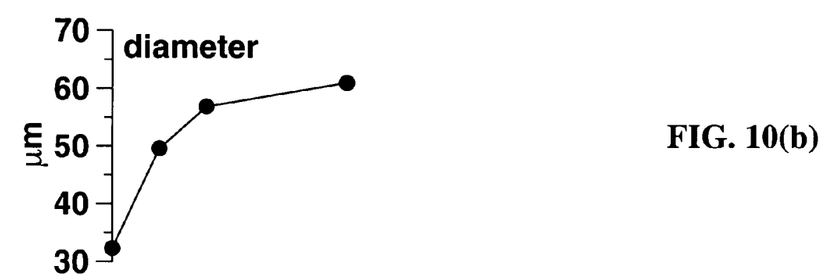

Sparking the lime-treated surface sludge increased the 30-minute clarification volume to 70 ml, which is comparable to the results shown in FIGS. 5 and 6 for bottom sludge. The specific charge quantity (the surface charge of all particulate and colloidal material present) increased linearly with the number of sparks as shown in FIG. 10(*a*). This would be the expected outcome if the particles agglomerated; the surface charge would drop because agglomeration would decrease the total surface area. The floc size increased with sparking as shown in FIG. 10(*b*), leveling off at a value approximately twice that of its initial size. These data confirm and complement the size increase noted in the micrographs of FIGS. 7 and 8.

Sparking the untreated surface sludge did not increase the settling rate, and no changes in floc size were seen, in contrast to the effect observed with the lime-treated material. The acoustic pulse resulting from a single spark is short-lived, and particles can or be acoustically agglomerated if they are in close proximity to one another. Sludge that is compacted (as in the case of bottom sludge) or flocculated through lime-treatment would, therefore, be more amenable to aggregation through sparking than would a dilute slurry.

Mechanism of Agglomeration

The agglomeration of particles in an acoustic field is well-known. Two mechanisms have been proposed. First, the particles can move to the nodes or antinodes of a standing acoustic wave where they can concentrate and then aggregate. [8] This situation does not apply to the present case since there are no standing waves.

In the second mechanism, an acoustic pulse can make small particles in close proximity to each other move with different velocities and agglomerate. It has been shown that 5-50 μm metal particles suspended in a hydrocarbon liquid collide and fuse when irradiated with ultrasound. [9] The particle size of activated sludge is in the same range. Its size distribution is bimodal, comprising 25-100 μm flocs and 0.5-5 μm free colloids. [10].

Figure 11:
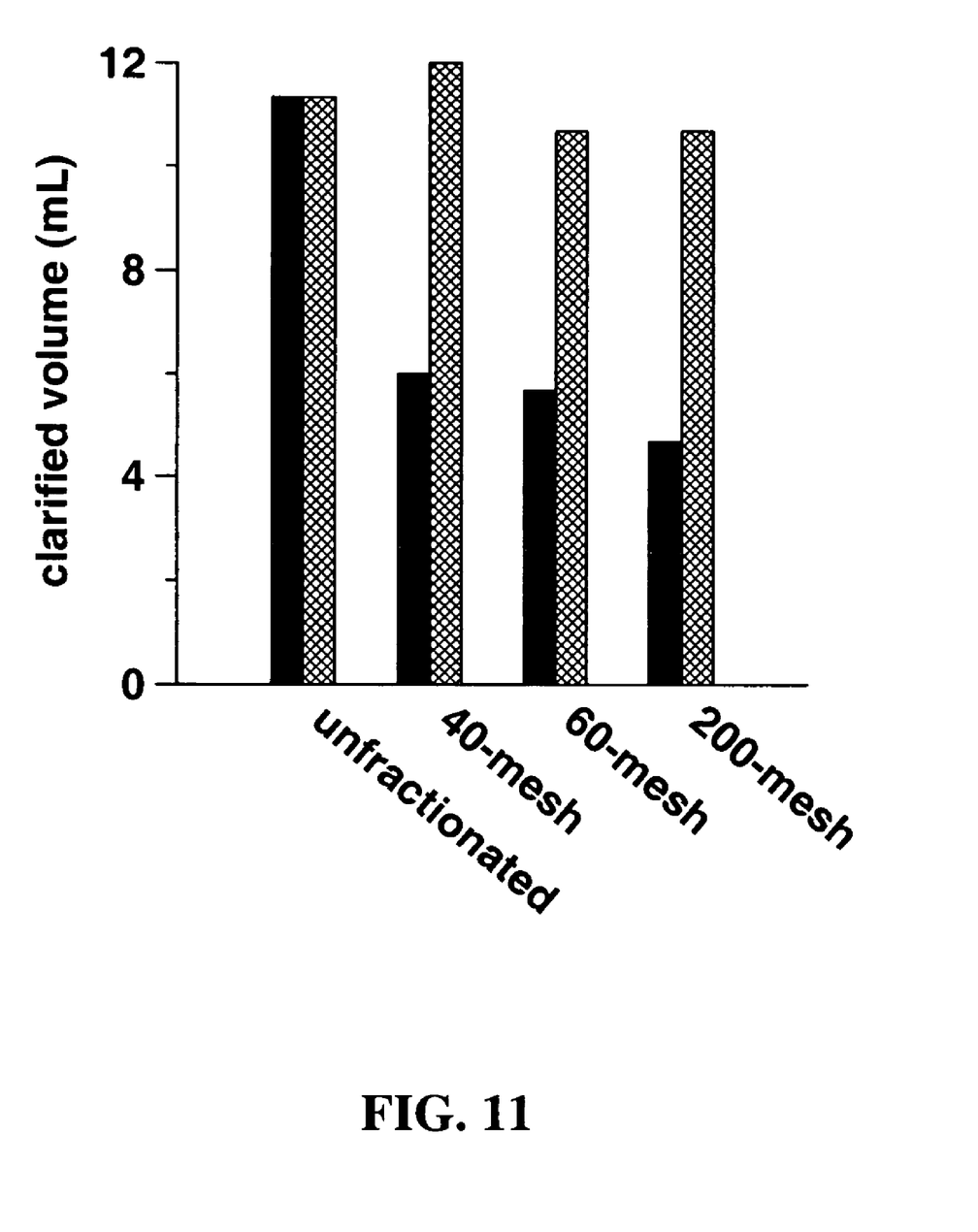
FIG. 11 is a graph illustrating the effect of sparking (20 sparks) on fiber settling, wherein the dark and hatched bars represent unsparked and sparked samples, respectively.

The interparticle velocities depend on particle size, and large particles are minimally accelerated. [9] Sludge particles are neither spherical nor uniform and it is difficult to define an optimal size for aggregation. However, sparking should have a smaller effect on larger particles, such as those that comprise paper mill primary sludge. This sludge was simulated by 0.1% suspensions of softwood fiber in water. Slurries containing fibers of various lengths were exposed to twenty, fifty and one hundred sparks, and the settling rate measured over thirty minutes in each case. The rates were similar for all the spark samples, an, and results for those sparked twenty time are illustrated in FIG. 11.

The settling rate for the unfractionated sample is insensitive to sparking because the particles are too large to be agglomerated by the acoustic pulse; the clarified volumes for the sparked arid unsparked samples were identical. The fractionated unsparked samples settle more slowly (as shown by the black bars in FIG. 11) because of their smaller particle size. However, the settling rates of these particles double upon sparking because they are acoustically agglomerated.

Figure 12:
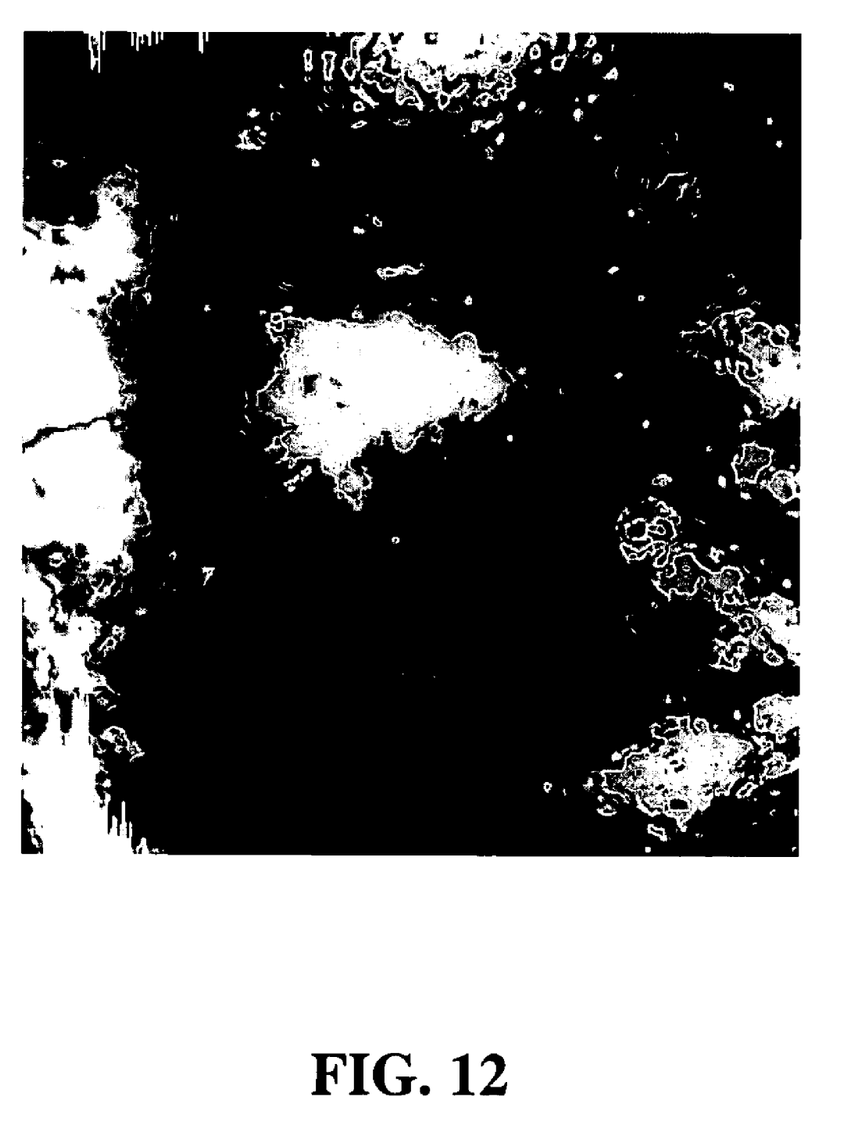
FIG. 12 is an image of a steam bubble, wherein on of the electrodes is visible in the lower part of the frame.

An estimate of the acoustic energy delivered to the system was obtained by capturing high-speed images of the electrode region during sparking. As voltage was applied to the electrodes, a stream of microbubbles flowed from the cathode to the anode. The spark discharge that followed was very rapid at less than 1 ms. A steam bubble of roughly 5.7-cm radius formed around the electrode gap by the water vaporized by the discharge as shown in FIG. 12.

According to the Rayleigh model, the time for an expanding bubble to reach its maximum radius ($R_{max}$) is given by $$\Delta t = R_{max} \sqrt{\frac{\rho}{6P_a}} \frac{\Gamma\left(\frac{5}{6}\right)\Gamma\left(\frac{1}{2}\right)}{\Gamma\left(\frac{4}{3}\right)} \quad (1)$$

where $\Gamma$ is the gamma function, $\rho$ is the density of water and $P_a$ is the ambient pressure. [11] The Lanczos approximation simplifies eq (1) to eq (2)

$$\Delta t = 0.915 R_{max} \sqrt{\frac{\rho}{P_a}} \quad (2)$$

Substitution of $\rho=1{,}000$ kg/m$^3$, $P_a=101{,}325$ Pa and $R_{max}=5.7$ cm yields a $\Delta t$ value of 5.2 ms, which is in good agreement with observations from the video, which shows the bubble growing for about 5 frames before reaching its full size.

The bubble wall velocity (U) and initial kinetic energy ($W_0$) are given by eq 3 and 4, respectively, $$U(R) = \sqrt{\frac{2P_a}{3\rho}\left(\frac{R_{max}^3}{R^3} - 1\right)} \quad (3)$$

$$W_0 = \frac{4\pi}{3} P_a R_{max}^3 \quad (4)$$

from which $W_0$=78.6 J. This is much higher than that delivered by most ultrasonic devices, and there is, therefore, clearly enough energy input to generate the necessary acoustic field. Despite its higher power output the overall energy cost of sparking is quite low, because sparking is not continuous. A spark was fired only once every twelve seconds in this work.

As discussed, sparking appears to consolidate biological sludge through acoustic agglomeration. The improvement in cake solids is beneficial, and the increase in settling rate is appreciable, which should translate to an increase in throughput across the gravity table. Primary (fibrous) sludge, which is composed of larger particles, is unaffected by sparking. High-speed images demonstrate that the spark generates a steam bubble, whose implosive collapse gives rise to the acoustic field.

EXAMPLE 2

The effect of sparking on sludge was measured in a full-scale in an operating wastewater facility. The sparker was positioned at the bottom of the secondary thickener tank, which was estimated to contain 80,000 gallons of the sludge slurry. The unit was placed just above the outflow pipe from the thickener tank from which the slurry was pumped out at a rate of about 800 gallons per minute. A spark was generated every 2.5 seconds.

The sludge was pumped from the thickener to a blend tank where it was mixed with polymer (Stockhausen 187 KH) at a dosage of 15 lbs/ton and flocculant (Stockhaused K133L) at a dosage of 7.5 lbs/ton. The polymer-treated sludge was dewatered in a belt press. The sludge exiting the belt press had a solids content of 18.2% before the sparker was activated. When the sparker was activated, the solids content of the pressed sludge increased to 19.1%. After the sparker was turned off, the solids content of the pressed sludge returned to 18.2%.

The structure of the pressed sludge was physically different when the sparker was operating. It was much more difficult to manually squeeze water out of the pressed sludge, which is indicative of a cake containing less water.

While the invention has been disclosed in its preferred forms, it will be apparent to those skilled in the art that many modifications, additions, and deletions can be made therein without departing from the spirit and scope of the invention and its equivalents, as set forth in the following claims.

The invention claimed is:

1. In a method of treating a suspension of particles in a fluid including the steps of (i) promoting flocculation of the particles and (ii) dewatering the flocs at a dewatering rate to form a cake with a solids content, the improvement comprising the step (iii) of exposing the suspension to a pulsed acoustic field, which step (iii) increases the dewatering rate of the flocs over that which is provided without step (iii) wherein the acoustic field is derived from a plurality of sparks generated at an amperage greater than 100 A, and a voltage greater than 500 V, and wherein each spark has an energy of at least 0.1 kJ.

2. The method of treating a suspension of particles in a fluid according to claim 1, wherein the acoustic field is derived from a plurality of sparks generated at a power of greater than 5 MW.

3. The method of treating a suspension of particles in a fluid according to claim 2, wherein the acoustic field is derived from a plurality of sparks generated at a power of between 100 MW to 400 MW.

4. The method of treating a suspension of particles in a fluid according to claim 1, wherein the acoustic field is derived from a plurality of sparks generated at an amperage of between 10 kA to 100 kA.

5. The method of treating a suspension of particles in a fluid according to claim 1, wherein the fluid is water.

6. The method of treating a suspension of particles in a fluid according to claim 1, wherein the suspension is a suspension of biological sludge in water.

7. The method of treating a suspension of particles in a fluid according to claim 1, wherein the suspension is a suspension of non biological fibrous material of particle size of less than about 2 mm.

8. In a method of treating a suspension of particles in a fluid including the steps of (i) promoting flocculation of the particles and (ii) dewatering the flocs at a dewatering rate to form a cake with a solids content, the improvement comprising the step (iii) of exposing the suspension to a pulsed acoustic field, which step (iii) increases the solids content of the cake after the step (ii) of dewatering over that which is provided without step (iii) wherein the acoustic field is derived from a plurality of sparks generated at an amperage greater than 100 A, and a voltage greater than 500 V, and wherein each spark has an energy of at least 0.1 kJ.

9. The method of treating a suspension of particles in a fluid according to claim 8, wherein the acoustic field is derived from a plurality of sparks generated at a power of greater than 5 MW.

10. The method of treating a suspension of particles in a fluid according to claim 9, wherein the acoustic field is derived from a plurality of sparks generated at a power of between 100 MW to 400 MW.

11. The method of treating a suspension of particles in a fluid according to claim 8, wherein the acoustic field is derived from a plurality of sparks generated at an amperage of between 10 kA to 100 kA.

12. The method of treating a suspension of particles in a fluid according to claim 8, wherein the fluid is water.

13. The method of treating a suspension of particles in a fluid according to claim 8, wherein the suspension is a suspension of biological sludge in water.

14. The method of treating a suspension of particles in a fluid according to claim 8, wherein the suspension is a suspension of non biological fibrous material of particle size of less than about 2 mm.

15. A method of treating sludge comprising the steps of:
  exposing the sludge to a pulsed acoustic field derived from a plurality of sparks generated at an amperage greater than 100 A, and a voltage greater than 500 V, wherein each spark has an energy of at least 0.1 kJ promoting flocculation of the sludge; and
  dewatering the sludge.

16. The method of treating sludge according to claim 15, wherein the plurality of sparks are generated at a voltage of between approximately 500 V to 20 kV, and an amperage of between approximately 10 kA to 100 kA.

17. The method of treating sludge according to claim 16, wherein the duration of the electrical discharge of each spark is less than 1 second.

18. The method of treating sludge according to claim 16, wherein the duration of the electrical discharge of each spark is between approximately 5 ms to 500 ms.

* * * * *